United States Patent
Chang

(10) Patent No.: US 10,026,453 B1
(45) Date of Patent: Jul. 17, 2018

(54) HARD DISK TRAY AND HARD DISK RACK ASSEMBLY

(71) Applicant: GIGA-BYTE TECHNOLOGY CO.,LTD., New Taipei (TW)

(72) Inventor: Yu-Chuan Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 20 days.

(21) Appl. No.: 15/452,733

(22) Filed: Mar. 8, 2017

(30) Foreign Application Priority Data

Dec. 28, 2016 (TW) .............................. 105143473 A

(51) Int. Cl.
| | |
|---|---|
| *G06F 1/16* | (2006.01) |
| *H05K 5/00* | (2006.01) |
| *H05K 7/00* | (2006.01) |
| *G11B 33/04* | (2006.01) |
| *G11B 33/00* | (2006.01) |
| *G11B 33/02* | (2006.01) |
| *G06F 1/18* | (2006.01) |

(52) U.S. Cl.
CPC .......... *G11B 33/0461* (2013.01); *G06F 1/187* (2013.01); *G11B 33/005* (2013.01); *G11B 33/027* (2013.01)

(58) Field of Classification Search
CPC ................................ G06F 1/183; G06F 1/187
USPC ....................................... 361/679.33–679.39
See application file for complete search history.

(56) References Cited

U.S. PATENT DOCUMENTS

| | | | | |
|---|---|---|---|---|
| 6,452,792 | B1 * | 9/2002 | Chen ....................... | G06F 1/184 312/223.1 |
| 7,180,733 | B2 * | 2/2007 | Chang ..................... | G06F 1/184 361/679.33 |
| 7,483,267 | B2 * | 1/2009 | Chen ....................... | G06F 1/184 361/679.31 |
| 7,639,492 | B2 * | 12/2009 | Thomas .................. | G06F 1/187 361/679.33 |
| 7,710,719 | B2 * | 5/2010 | Hong .................... | G11B 33/022 248/633 |

(Continued)

FOREIGN PATENT DOCUMENTS

| | | |
|---|---|---|
| CN | 201255997 | 6/2009 |
| TW | M258391 | 3/2005 |

(Continued)

OTHER PUBLICATIONS

"Office Action of Taiwan Counterpart Application," dated Oct. 3, 2017, p. 1-p. 4.

*Primary Examiner* — Anthony Haughton
(74) *Attorney, Agent, or Firm* — JCIPRNET

(57) ABSTRACT

A hard disk tray adapted for accommodating a hard disk having a plurality of screw holes at two sides is provided. The hard disk tray includes a body and a cover. The body includes two body lateral walls and a plurality of fixing members protruding from the two body lateral walls and corresponding to at least a part of the screw holes. The cover is pivoted to the body and includes two cover lateral walls. When the hard disk is placed in the hard disk tray, the fixing members extend into the at least a part of the screw holes, and when the cover is closed to the body, the two cover lateral walls are located outside the two body lateral walls so as to prevent the two body lateral walls from moving outwardly. A hard disk rack assembly is further provided.

9 Claims, 7 Drawing Sheets

(56) References Cited

U.S. PATENT DOCUMENTS

| | | | | |
|---|---|---|---|---|
| 8,369,078 | B2 * | 2/2013 | Tang | G11B 33/12 |
| | | | | 361/679.33 |
| 9,401,181 | B2 * | 7/2016 | Her | H05K 7/1401 |
| 2007/0058333 | A1 * | 3/2007 | Kim | G06F 1/187 |
| | | | | 361/679.59 |
| 2012/0087084 | A1 * | 4/2012 | Nguyen | G06F 1/187 |
| | | | | 361/679.37 |

FOREIGN PATENT DOCUMENTS

| | | |
|---|---|---|
| TW | M345317 | 11/2008 |
| TW | M368877 | 11/2009 |
| TW | 201237854 | 9/2012 |
| TW | 201314676 | 4/2013 |
| TW | M507054 | 8/2015 |
| TW | 201601146 | 1/2016 |
| TW | 201637546 | 10/2016 |

* cited by examiner

HARD DISK TRAY AND HARD DISK RACK ASSEMBLY

CROSS-REFERENCE TO RELATED APPLICATION

This application claims the priority benefit of Taiwan application serial no. 105143473, filed on Dec. 28, 2016. The entirety of the above-mentioned patent application is hereby incorporated by reference herein and made a part of this specification.

BACKGROUND

Field of the Invention

The invention is directed to a disk tray and a disk rack assembly and more particularly, to a disk tray and a disk rack assembly capable of being fixed without any screw.

Description of Related Art

Generally, when a hard disk is to be installed in a server, the hard disk usually has to be locked onto a disk tray (i.e., an HDD tray), and then, a plurality of disk trays are fixed to a hard disk rack (i.e., an HDD rack), so as to be installed together in the server. However, the hard disks are disposed in the server in a large amount, and if an operator intends to assemble, replace or repair one or more hard disks, they would encounter complicated locking and detaching procedures.

Moreover, a server in a new specification has been developed, which is also referred to as an open computer project (OCP) server requiring a hot-swap operation of the hard disks. However, if the screws have to be removed before the hard disks are detached, which is inconvenient for performing the hot-swap operation.

SUMMARY

The invention provides a disk tray capable of fixing hard disks without any screw, which can effectively enhance the efficiency of assembling and disassembling the hard disks.

The invention provides a disk rack assembly having a disk tray capable of being fixed to the hard disk rack in a screw-free manner.

A disk tray adapted for accommodating a hard disk having a plurality of screw holes at two sides is provided according to an embodiment of the invention. The disk tray includes a body and a cover. The body includes two body lateral walls and a plurality of fixing members protruding from the two body lateral walls and corresponding to at least a part of the screw holes. The cover is pivoted to the body and includes two cover lateral walls. When the hard disk is placed in the hard disk tray, the fixing members extend into the at least a part of the screw holes, and when the cover is closed to the body, the two cover lateral walls are located outside the two body lateral walls, so as to prevent the two body lateral walls from moving outwardly.

In an embodiment of the invention, a hardness of the cover is greater than a hardness of the body.

In an embodiment of the invention, the disk tray further includes an elastic member disposed between the body and the cover and adjacent to a position where the cover is pivoted to the body.

In an embodiment of the invention, one of each of the body lateral walls and its corresponding cover lateral wall includes a pivot hole, and the other one includes a pivot shaft passing through the pivot hole.

In an embodiment of the invention, each of the body lateral walls includes a first body engagement member extending in a first direction and bent in a second direction, the disk tray is adapted to be fixed together with the hard disk to a hard disk rack, the hard disk rack includes a plurality of first hard disk rack engagement members corresponding to the first body engagement members, and the body is adapted to be engaged with the first hard disk rack engagement members through the first body engagement members, so as to prevent the body from moving relatively to the hard disk rack in a direction opposite to the first direction and from moving in the second direction, wherein the first direction is perpendicular to the second direction.

In an embodiment of the invention, each of the cover lateral walls includes a first cover engagement member, the hard disk rack includes a plurality of second hard disk rack engagement members corresponding to the first cover engagement members, and when the body is disposed on the hard disk rack, and the cover is closed to the body, the first cover engagement members are engaged with the second hard disk rack engagement members, so as to prevent the cover from moving relatively to the hard disk rack in a direction opposite to the second direction.

In an embodiment of the invention, the body includes a second body engagement member, the cover includes a second cover engagement member corresponding to the second body engagement member, and the cover is fixed to the body through the second cover engagement member in co-ordination with the second body engagement member.

A disk rack assembly adapted to be disposed together with a hard disk in a server is provided according to an embodiment of the invention. The disk rack assembly includes a hard disk rack and a disk tray. The hard disk rack includes a hard disk rack bottom and a plurality of first hard disk rack engagement members and a plurality of second hard disk rack engagement members which are disposed on the hard disk rack bottom. The disk tray is detachably fixed to the hard disk rack and adapted to carry the hard disk, and includes a body and a cover. The body includes two body lateral walls. Each of the body lateral walls includes a first body engagement member extending in a first direction and bent in a second direction. The cover is pivoted to the body and includes two cover lateral walls. Each of the cover lateral wall includes a first cover engagement member. The body is prevented from moving relatively to the hard disk rack in a direction opposite to the first direction and from moving in the second direction by the first body engagement members engaged with the first hard disk rack engagement members. When the cover is closed to the body, the first cover engagement members are engaged with the second hard disk rack engagement members, so as to prevent the cover from moving relatively to the hard disk rack in a direction opposite to the second direction.

In an embodiment of the invention, the hard disk rack includes a plurality of fixing structures respectively fixed to the hard disk rack bottom and located at two sides of the disk tray to form a guiding rail. The first hard disk rack engagement members and the second hard disk rack engagement members are respectively formed on the fixing structures.

In an embodiment of the invention, the hard disk includes a plurality of screw holes at two sides. The body includes a plurality of fixing members protruding from the two body lateral walls and corresponding to at least a part of the screw holes. When the hard disk is placed in the hard disk tray, the fixing members extend into the at least a part of the screw holes, and when the cover is closed to the body, the two cover lateral walls are located outside the two body lateral walls, so as to prevent the two body lateral walls from moving outwardly.

To sum up, the fixing members on the two body lateral walls of the disk tray of the invention can extend into the corresponding screw holes on the hard disk. When the cover is closed to the body, the two cover lateral walls are located outside the two body lateral walls, so as to prevent the two body lateral walls from moving outwardly. Thereby, the fixing members are maintained in the corresponding screw holes on the hard disk to fix the hard disk to the disk tray. Additionally, in the invention, the body of the disk tray of the disk rack assembly can be engaged with the first hard disk rack engagement members of the hard disk rack through the first body engagement members, so as to prevent the body from moving relatively to the hard disk rack in the direction opposite to the first direction and from moving in the second direction. Meanwhile, when the cover is closed to the body, the first cover engagement members are engaged with the second hard disk rack engagement members, so as to prevent the cover from moving relatively to the hard disk rack in the direction opposite to the second direction to lock the disk tray to the hard disk rack.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 6:
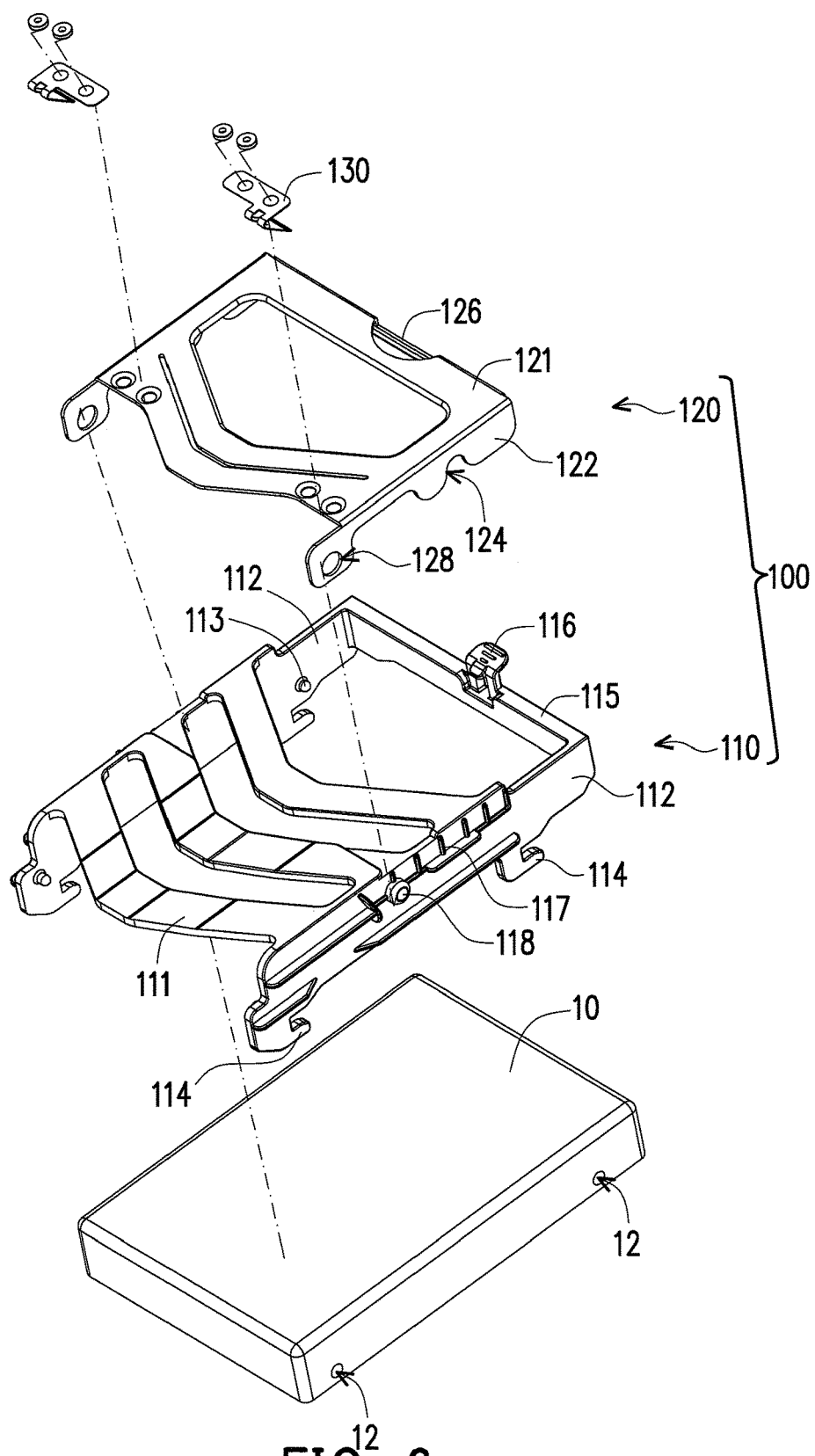
FIG. 6 is a schematic exploded view of the hard disk and the disk tray depicted in FIG. 1.
Figure 7:
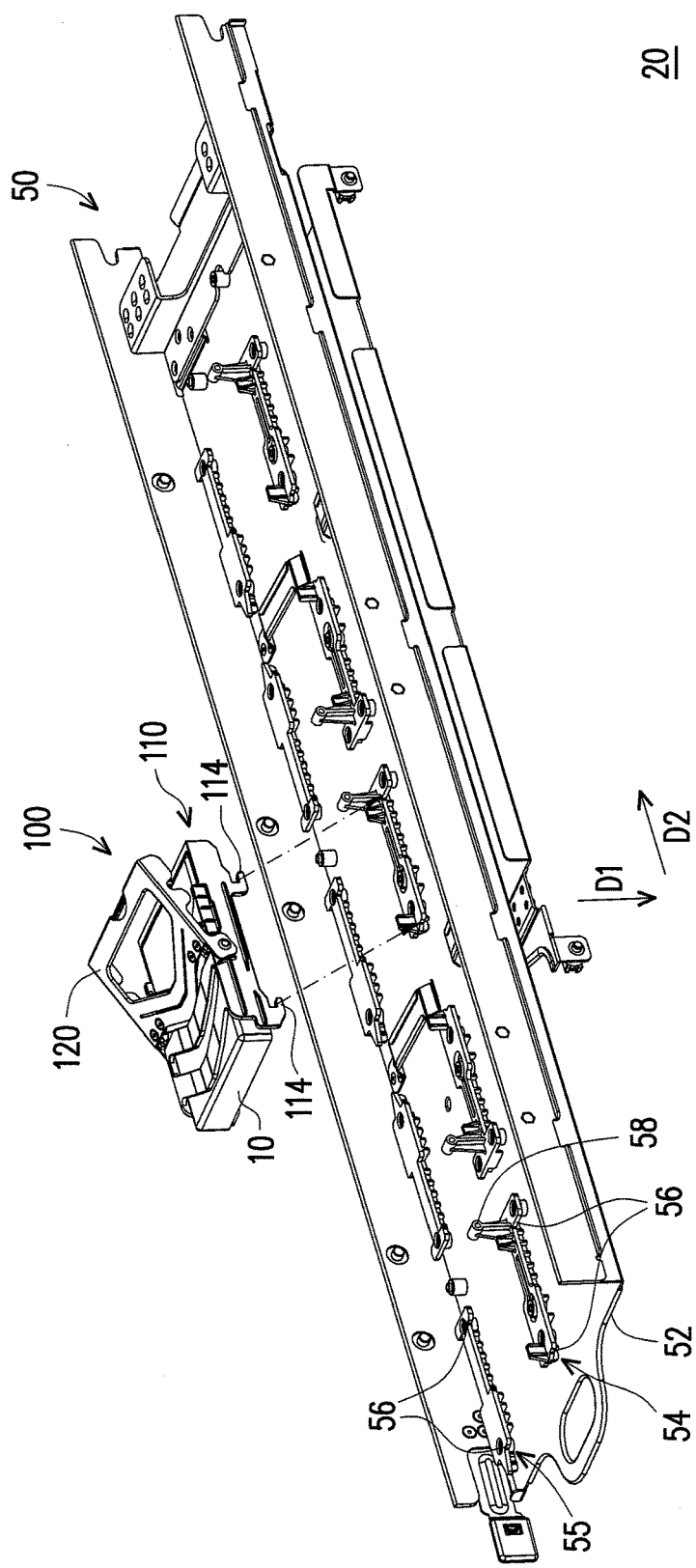
FIG. 7 is a schematic view illustrating a disk tray of a disk rack assembly which is not yet installed to a hard disk rack according to an embodiment of the invention.

A disk tray 100 of the present embodiment is adapted to fix a hard disk 10 (which is illustrated in FIG. 6) thereon, and to be installed together with other disk trays 100 to a hard disk rack (which is illustrated in FIG. 7) of a server (not shown). In the present embodiment, the disk tray 100 is a disk tray adapted to accommodate a 2.5-inch hard disk, for example. However, in other embodiments, the disk tray 100 may also be a disk tray adapted to accommodate a 3.5-inch hard disk, and the size of the disk tray 100 may be adjusted in correspondence to the size of the hard disk 10 to be fixed thereon. Generally, the hard disk 10 includes a plurality of screw holes 12 located at two sides of the hard disk 10. The hard disk 10 is fixed to the disk tray 100 of the present embodiment in a screw-free locking manner with the design that the screw holes 12 are disposed on specific positions of the hard disk 10, thereby providing an operator with a convenient and fast use effect, which will be further introduced below.

Figure 1:
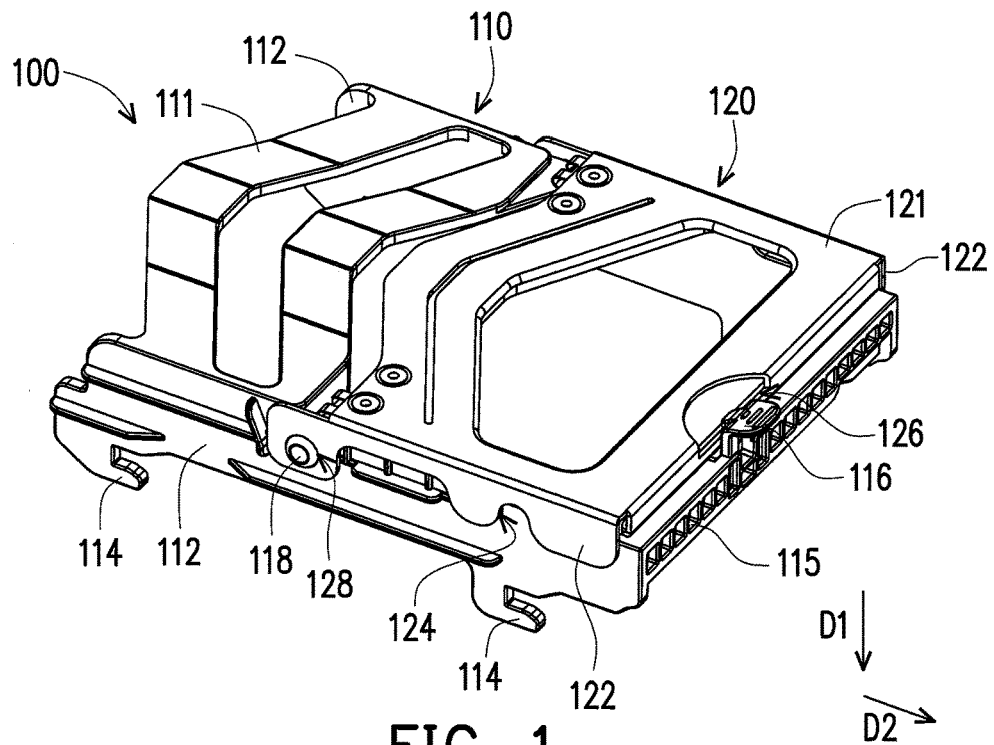
FIG. 1 and FIG. 2 are schematic views respectively illustrating a cover of a disk tray closed to a body in a plurality of viewing angles according to an embodiment of the invention.
Figure 2:
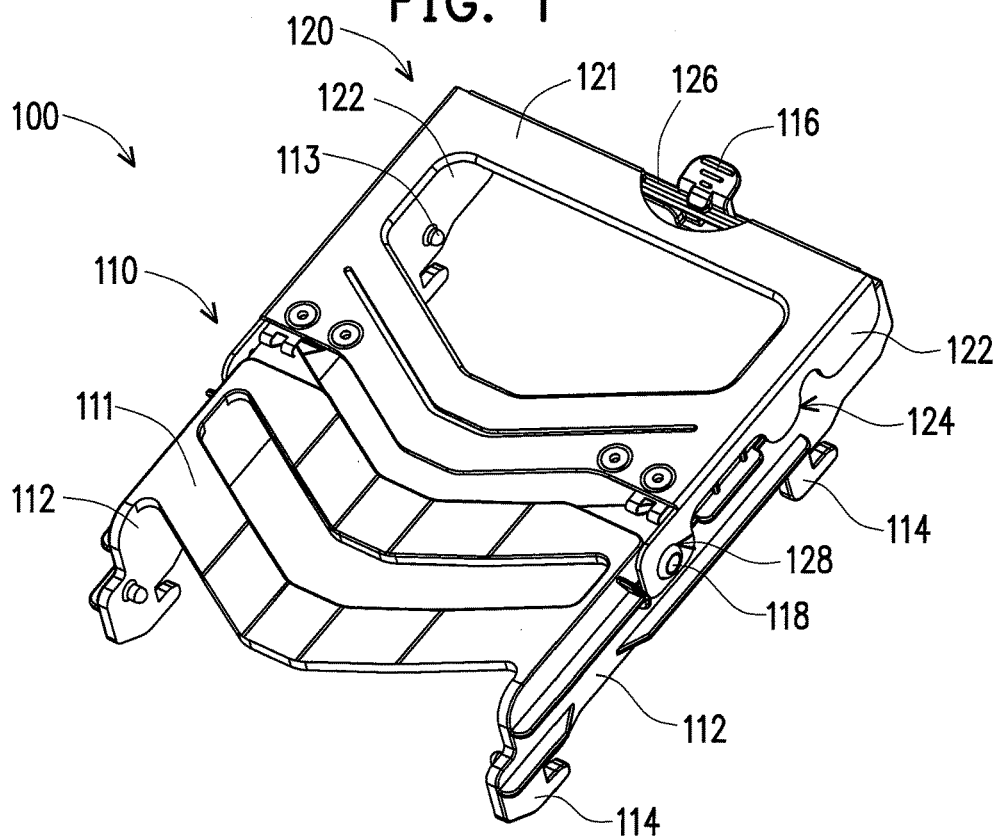
Figure 3:
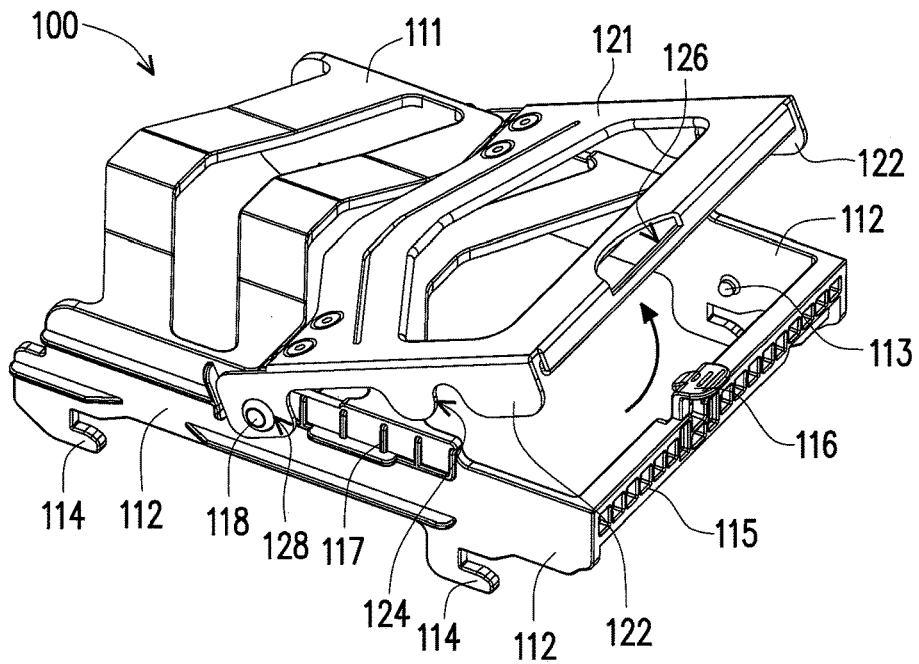
FIG. 3 to FIG. 5 are schematic views respectively illustrating the cover of the disk tray depicted in FIG. 1 in an open state in a plurality of viewing angles.
Figure 4:
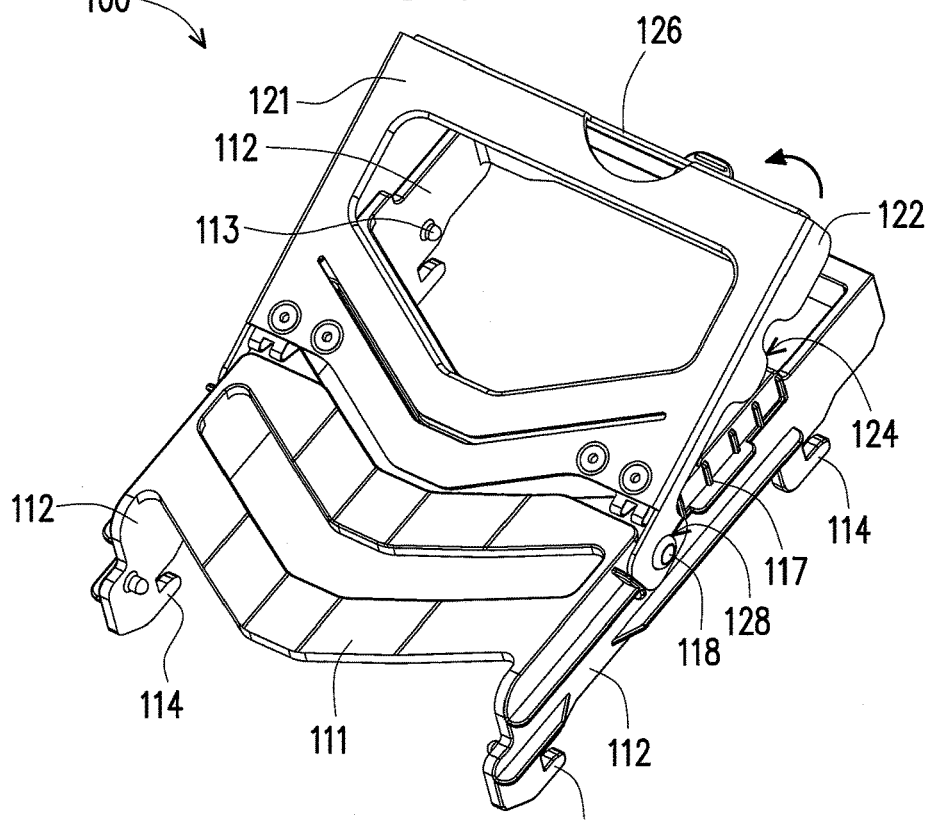
Figure 5:
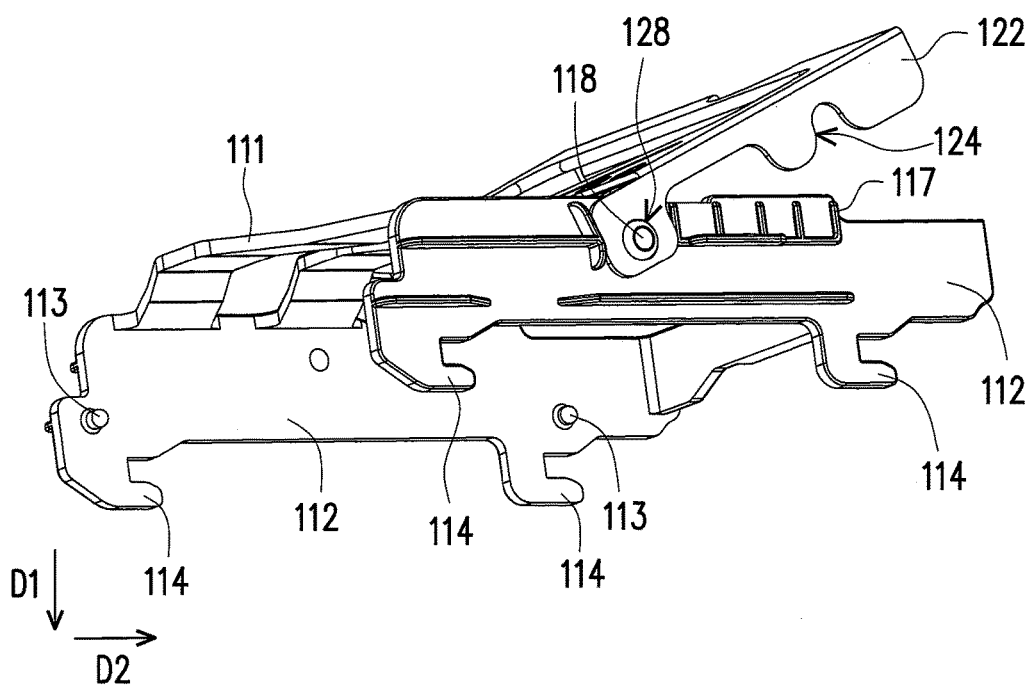

FIG. 1 and FIG. 2 are schematic views respectively illustrating a cover of a disk tray closed to a body in a plurality of viewing angles according to an embodiment of the invention. FIG. 3 to FIG. 5 are schematic views respectively illustrating the cover of the disk tray depicted in FIG. 1 in an open state in a plurality of viewing angles. FIG. 6 is a schematic exploded view of the hard disk and the disk tray depicted in FIG. 1.

Referring to FIG. 1 to FIG. 6, the disk tray 100 of the present embodiment includes a body 110 and a cover 120. The body 110 includes a body top 111, two body lateral walls 112, a plurality of fixing members 113 and a connection wall 115. The body top 111 and the connection wall 115 are respectively connected to the two body lateral walls 112. The fixing members 113 respectively protrude from the two body lateral walls 112 and correspond to at least a part of the screw holes 12 of the hard disk 10.

Each body lateral wall 112 includes at least one first body engagement member 114 and a second body engagement member 116. The first body engagement members 114 are located under the body lateral walls 112, extend in a first direction D1 (i.e., downward) and are bent in a second direction D2, so as to be fixed to a hard disk rack 50. The second body engagement members 116 are located at a front end of the body 110. In the present embodiment, the second body engagement members 116 are cantilever-like hooks.

The cover 120 is pivoted to the body 110 and includes a cover top 121 and two cover lateral walls 122 connected with the cover top 121. One of each body lateral wall 112 and its corresponding cover lateral wall 122 includes a pivot hole 128, and the other one includes a pivot shaft 118 passing through the pivot hole 128. For instance, in the present embodiment, each body lateral wall 112 includes a pivot shaft 118, and its corresponding cover lateral wall 122 includes a pivot hole 128 corresponding to the pivot shaft 118, such that the cover 120 is pivoted to the body 110 and rotates relatively to the body 110.

Each cover lateral wall 122 includes a first cover engagement member 124 and a second cover engagement member 126. In the present embodiment, the first cover engagement members 124 are holes recessed in edges of the cover lateral walls 122 and used to be fixed to the hard disk rack 50. The second cover engagement members 126 correspond to the second body engagement members 116. In the present embodiment, the second cover engagement members 126 are rods for the hook-like second body engagement members 116 to engage with. Thus, the cover 120 is fixed to the body 110 through the second cover engagement members 126 in co-ordination with the second body engagement members 116.

In the present embodiment, if the cover 120 is to be opened, as long as the second body engagement member 116 moves in the second direction D2, the second body engagement members 116 may be released from the second cover engagement members 126, such that the cover 120 is lifted to move from a position illustrated in FIG. 1 to a position illustrated in FIG. 3. In the present embodiment, the disk tray 100 further includes at least one elastic member 130 (for example, two elastic members 130) disposed between the body 110 and the cover 120 and adjacent to a position where the cover 120 is pivoted to the body 110. Thus, when the second body engagement members 116 are released from the second cover engagement members 126, the cover 120 is automatically lifted relatively to the body 110. Certainly, in other embodiments, the cover 120 may also be lifted manually by a user, and the disposition of the elastic members 130 may be omitted.

In the present embodiment, the fixing members 113 on the two body lateral walls 112 of the disk tray 100 is capable of extending into the corresponding screw holes 12 on the hard disk 10. When the hard disk 10 is placed in the disk tray 100, the fixing members 113 extend into at least a part of the screw holes 12 of the hard disk 10, and when the cover 120 is closed to the body 110, the two cover lateral walls 122 are located outside the two body lateral walls 112, so as to prevent the two body lateral walls 112 from moving outwardly. Thereby, the fixing members 113 on the two body lateral walls 112 may be maintained in the corresponding screw holes 12 on the hard disk 10, so as to fix the hard disk 10 to the disk tray 100. Thus, the hard disk 10 may be fixed to the disk tray 100 of the present embodiment in a screw-free manner, which bring the user with convenience for assembly and disassembly.

In the present embodiment, a plurality of ribs 117 (which are illustrated in FIG. 3) are provided outside the two body lateral walls 112 of the body 110, and when the cover 120 is closed to the body 110, the two cover lateral walls 122 of the cover 120 contact the ribs 117 of the two body lateral walls 112 and slightly press the two body lateral walls 112 of the body 110, such that the fixing members 113 extend into the screw holes 12 of the hard disk 10 more deeply, thereby providing a more preferable retaining force. In other embodiments, bumps may also be provided outside the body lateral walls 112 in replacement of the ribs 117. Both the designs of the ribs 117 and the bumps may contribute to an effect of pushing the body lateral walls 112 inwardly in a premise of less friction during the process of the cover 120 being closed to the body 110.

In the present embodiment, a hardness of the cover 120 is greater than a—hardness of the body 110. For example, a material of the body 110 includes plastic, and a material of the cover 120 includes metal, but the materials of the body 110 and the cover 120 are not limited thereto. As the hardness of the cover 120 is greater than the hardness of the body 110, the body lateral walls 112 are subject to be pressed by the cover lateral walls 122 to contract inwardly during the process of the cover 120 being closed to the body 110. Alternatively, in other embodiments, even though the body lateral walls 112 are not pushed inwardly by the cover lateral walls 122 (i.e., the cover lateral walls 122 only contact the body lateral walls 112 without pressing the body lateral walls 112 and are located outside the body lateral walls 112) during the process of the cover 120 being closed to the body 110, the cover lateral walls 122 may be less deformed outwardly in the presence of the cover lateral walls 122 with the greater hardness being located outside.

Certainly, in other embodiments, the hardness of the cover 120 may be the same as that of the body 110. For example, both of the body 110 and the cover 120 may be made of the same or similar material and achieve the effect of preventing the body lateral walls 112 from being deformed outwardly by means of structural designs.

FIG. 7 is a schematic view illustrating a disk tray of a disk rack assembly which is not yet installed to a hard disk rack according to an embodiment of the invention. It should be noted that the disk tray 100 illustrated in FIG. 1 is used as an example of a disk tray 100 of a disk rack assembly 20 in the present embodiment, and thus, the element symbols of the above embodiment are used, but a form of the disk tray 100 of the disk rack assembly 20 is not limited thereto.

Referring to FIG. 7, the disk rack assembly 20 of the present embodiment includes a hard disk rack 50 and at least one disk tray 100. The disk tray 100 is detachably fixed to the hard disk rack 50. The hard disk rack 50 includes a hard disk rack bottom 52 and a plurality of fixing structures 54 and 55 disposed on the hard disk rack bottom 52. According to FIG. 7, the hard disk rack 50 includes the fixing structures 54 and 55 in three rows. In the fixing structures 55 in the left and the right rows, each fixing structure 55 includes at least one first hard disk rack engagement member 56. To be more specific, each fixing structure 55 includes two first hard disk rack engagement members 56. The first hard disk rack engagement members 56 are in a structure for the first body engagement members 114 to engage with, for example, a plate spaced from the hard disk rack bottom 52 in a distance and allowing a hook to extend into. In the fixing structures 54 in the central row, each fixing structure 54 includes at least one first hard disk rack engagement member 56 and a second hard disk rack engagement member 58. To be more specific, each fixing structure 54 includes two first hard disk rack engagement members 56 and a second hard disk rack engagement member 58. The second hard disk rack engagement member 58 is a structure for the first cover engagement members 124 to engage with, for example, a convex column protruding in a horizontal direction. Certainly, forms of the first hard disk rack engagement members 56 and the second hard disk rack engagement member 58 are not limited thereto.

In the present embodiment, the three row of fixing structures 54 and 55 may be used to fix the disk trays 100 in two rows. Namely, each disk tray 100 is in co-ordination with the two fixing structures 54 and 55 in its adjacent rows and located between the corresponding two fixing structures 54 and 55. According to FIG. 7, the fixing structures 54 and 55 in the adjacent rows form guiding rails for the disk tray 100 to slide in to be fixed. The manner of fixing the disk trays 100 to the hard disk rack 50 will be described below.

Additionally, in the present embodiment, each row including five fixing structures 54 and 55 is taken as an example. Thus, the hard disk rack 50 of the present embodiment is capable of accommodating and fixing ten disk trays 100 in total. In terms of the conventional (OCP) server, the hard disk rack 50 is usually capable of accommodating two to four disk trays 100; while the structure of the present embodiment is capable of accommodating more disk trays 100 in the same spatial capacity, hence, data storage capacity of the server is enhanced. Certainly, the number of the fixing structures 54 and 55 on the hard disk rack 50 may be adjusted based on demands and is not limited thereto.

Additionally, in the present embodiment, the first hard disk rack engagement members 56 are respectively formed on the fixing structures 54 and 55, and the second hard disk rack engagement members 58 are respectively formed on the fixing structures 54. The fixing structures 54 and 55 are fixed to the hard disk rack bottom 52 in a locking manner. However, in other embodiments, the first hard disk rack engagement members 56 and the second hard disk rack engagement members 58 may be extended from the hard disk rack bottom 52. For example, the hard disk rack bottom 52 is manufactured with U shape slits, and portions surrounded by the U shape slits are bent to form structures standing on the hard disk rack bottom 52, which serve as the first hard disk rack engagement members 56 and the second hard disk rack engagement members 58 for engaging the body 110 and the cover 120 of the disk trays 100. Alternatively, in other embodiments, the first hard disk rack engagement members 56 and the second hard disk rack engagement members 58 may also be formed on the hard disk rack bottom 52 integrally or in other manners.

Figure 8:
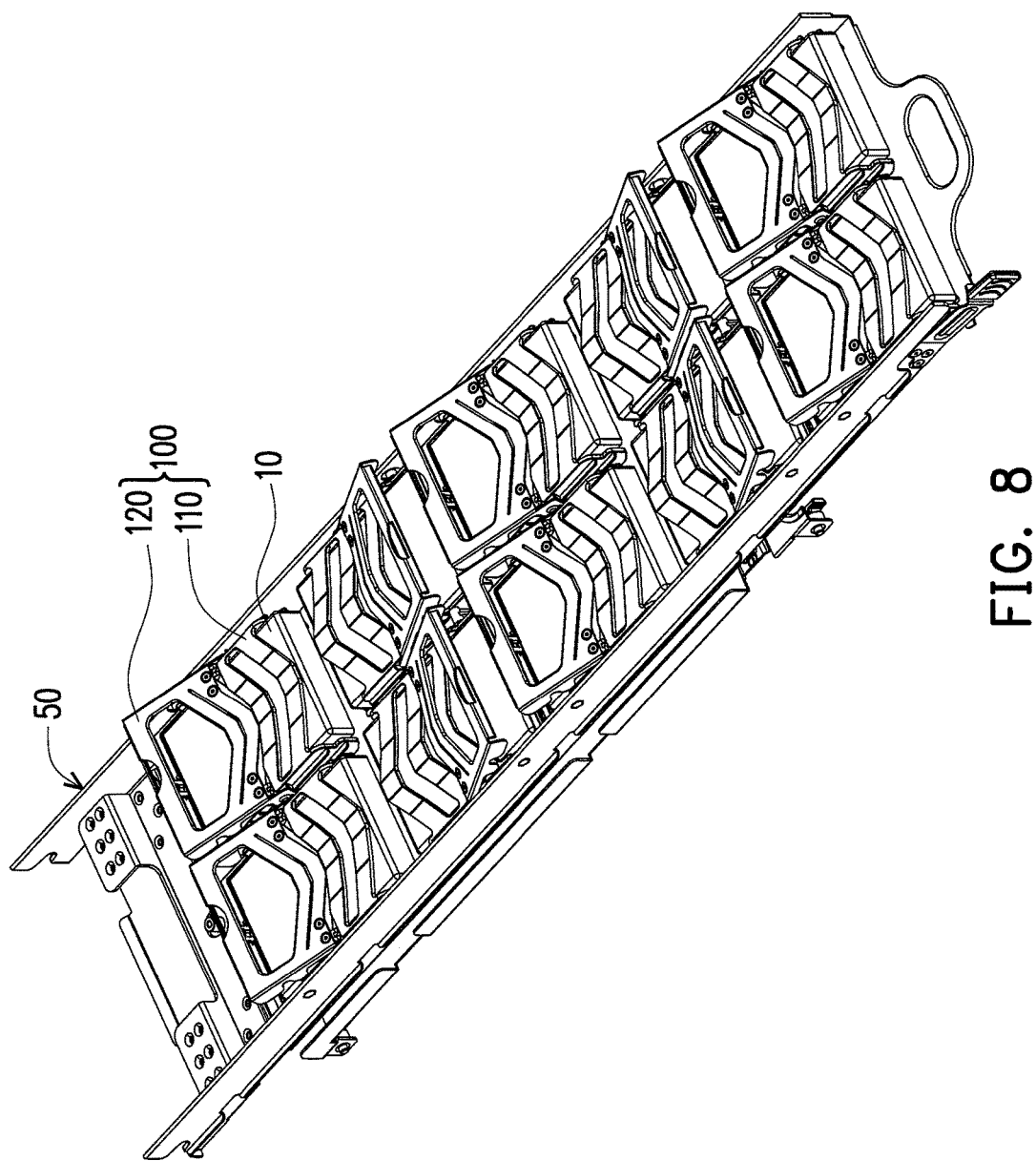
FIG. 8 is a schematic view illustrating that the disk tray of the disk rack assembly depicted in FIG. 7 is installed to the hard disk rack, and the cover of the disk tray is not yet closed to the body.
Figure 9:
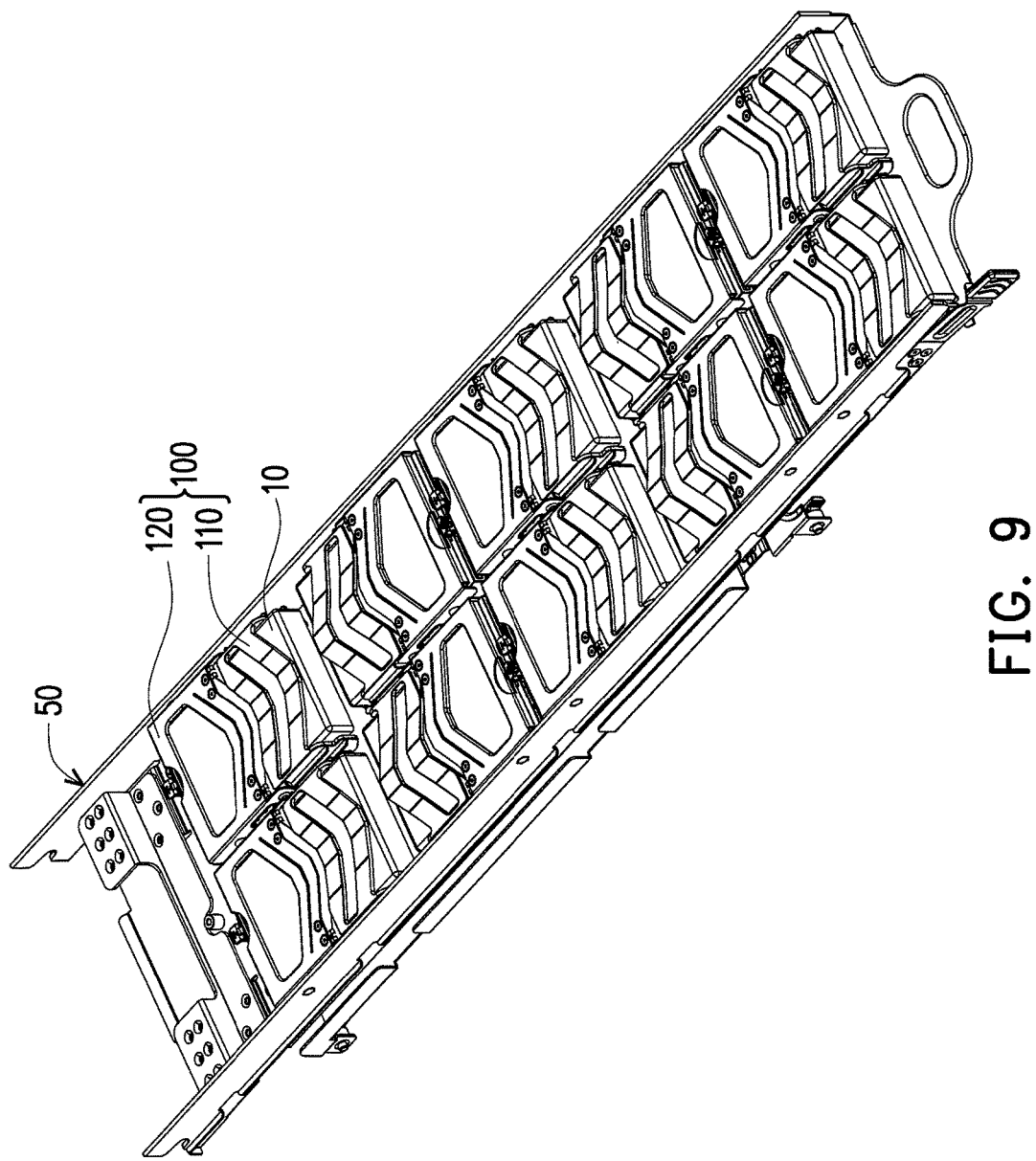
FIG. 9 is a schematic view illustrating that the disk tray of the disk rack assembly depicted in FIG. 7 is installed to the hard disk rack, and the cover of the disk tray is closed to the body.

FIG. 8 is a schematic view illustrating that the disk tray of the disk rack assembly depicted in FIG. 7 is installed to the hard disk rack, and the cover of the disk tray is not yet closed to the body 110. FIG. 9 is a schematic view illustrating that the disk tray of the disk rack assembly depicted in FIG. 7 is installed to the hard disk rack, and the cover of the disk tray is closed to the body. Referring to FIG. 7 to FIG. 9, when the disk tray 100 is to be installed to the hard disk rack 50, the disk tray 100 is slid into the fixing structures 54 and 55 in the second direction D2 illustrated in FIG. 7, such that the four first body engagement members 114 of the two body lateral walls 112 of the body 110 of the disk tray 100 are respectively engaged with the corresponding first hard disk rack engagement members 56 and in positions illustrated in FIG. 8. In this circumstance, the cover 120 of the disk tray 100 in not yet closed to the body 110. Then, the cover 120 is closed to the disk tray 100 body 110. In the present embodiment, the first cover engagement members 124 recessed in the edges of the cover lateral walls 122 are gradually engaged with the column-like second hard disk rack engagement members 58 along with the cover 120 being closed and engaged in positions illustrated in FIG. 9.

When the disk tray 100 is fixed to the hard disk rack 50 in a manner as illustrated in FIG. 9, the first body engagement members 114 are engaged with the first hard disk rack engagement members 56, such that the body 110 is prevented from moving relatively to the hard disk rack 50 in a direction opposite to the first direction D1 (which is an upward direction illustrated in FIG. 7). When the cover 120 is closed to the body 110, the first cover engagement members 124 are engaged with the second hard disk rack engagement members 58, the cover 120 is prevented from moving relatively to the hard disk rack 50 in the second direction D2 (which is a rightward direction illustrated in FIG. 7) and in a direction opposite to the second direction D2 (which is a leftward direction illustrated in FIG. 7). Thus, the disk tray 100 of the present embodiment is capable of being fixed to the hard disk rack 50 without any screw, which enhances convenience for assembly and disassembly.

It should be mentioned that since the first cover engagement members 124 are the holes recessed in the edges of the cover lateral walls 122, the column-like second hard disk rack engagement members 58 gradually extend into the first cover engagement member 124 along the edges of the first cover engagement members 124 during the process of the cover 120 being closed to the body 110. In this process, the cover 120 not only is closed to the body 110 in a clockwise or a counterclockwise direction, but also slightly moves in the second direction D2 during the process of being closed due to the first cover engagement members 124 moving along outer edges of the second hard disk rack engagement member 58. Namely, before and after the cover 120 is closed to the body 110, the position of the disk tray 100 relative to the hard disk rack 50 slightly moves in the second direction D2.

Thus, after the cover 120 is closed to the body 110, the first body engagement members 114 extend into the first hard disk rack engagement member 56 more deeply in the second direction D2, such that the first body engagement members 114 may contact the first hard disk rack engagement members 56, so as to prevent the body 110 from moving relatively to the hard disk rack 50 in the second direction D2 (which is the rightward direction illustrated in FIG. 7). Namely, when the cover 120 is not closed to the body 110, the first body engagement members 114 are slightly engaged with the first hard disk rack engagement members 56 to prevent the body 110 from moving in the direction opposite to the first direction D1. After the cover 120 is closed to the body 110, the first body engagement members 114 not only prevent the body 110 from moving in the direction opposite to the first direction D1, but also prevent the body 110 from moving relatively to the hard disk rack 50 in the second direction D2.

A connector (not shown) may also be disposed on the hard disk rack bottom 52 of the hard disk rack 50 in correspondence to a front end of the disk tray 100 when the cover 120 is closed, and after the cover 120 is closed, the disk tray 100 slight moves in the second direction D2 to be more adjacent to the connector, such that the hard disk 10 accommodated in the disk tray 100 may be directly inserted into the connector on the hard disk rack bottom 52 after the cover 120 is closed.

In the same way, when the hard disk 10 accommodated in the disk tray 100 is to be unplugged, the cover 120 is automatically lifted relatively to the body 110 as long as the second body engagement member 116 is ejected. During the process of the cover 120 being lifted, the column-like second hard disk rack engagement members 58 are gradually ejected from the first cover engagement members 124 along the edges of the first cover engagement member 124, such that the cover 120 slightly moves in a directly away from the second direction D2, and the hard disk 10 moves along therewith to separate from the connector. That is, the disk rack assembly 20 of the present embodiment may achieve a hot-swap operation of the hard disk 10 while the cover 120 is closed and opened, which is adapted to the OCP server and enhances operational convenience of the user.

In light of the foregoing, the fixing members on the two body lateral walls of the disk tray of the invention can extend into the corresponding screw holes on the hard disk. When the cover is closed to the body, the two cover lateral walls are located outside the two body lateral walls, so as to prevent the two body lateral walls from moving outwardly. Thereby, the fixing members are maintained in the corresponding screw holes on the hard disk to fix the hard disk to the disk tray. Additionally, the body of the disk tray of the disk rack assembly of the invention can be engaged with the first hard disk rack engagement members of the hard disk rack through the first body engagement members, so as to prevent the body from moving relatively to the hard disk rack in the direction opposite to the first direction and from moving in the second direction. Meanwhile, when the cover is closed to the body, the first cover engagement members are engaged with the second hard disk rack engagement members, so as to prevent the cover from moving relatively to the hard disk rack in the direction opposite to the second direction to lock the disk tray to the hard disk rack.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A disk tray, adapted for accommodating a hard disk having a plurality of screw holes at two sides, the disk tray comprising:
a body, comprising two body lateral walls and a plurality of fixing members protruding from the two body lateral walls and corresponding to at least a part of the screw holes; and
a cover, pivoted to the body and comprising two cover lateral walls, and a hardness of the cover is greater than a hardness of the body, wherein
when the hard disk is placed in the hard disk tray, the fixing members extend into the at least a part of the screw holes, and when the cover is closed to the body, the two cover lateral walls are located outside the two body lateral walls, so as to prevent the two body lateral walls from moving outwardly.

2. The disk tray according to claim 1, further comprising:
an elastic member, disposed between the body and the cover and adjacent to a position where the cover is pivoted to the body.

3. The disk tray according to claim 1, wherein one of each of the body lateral walls and its corresponding cover lateral wall comprises a pivot hole, and the other one comprises a pivot shaft passing through the pivot hole.

4. The disk tray according to claim 1, wherein each of the body lateral walls comprises a first body engagement member extending in a first direction and bent in a second direction, the disk tray is adapted to be fixed together with the hard disk to a hard disk rack, the hard disk rack comprises a plurality of first hard disk rack engagement members corresponding to the first body engagement members, and the body of the hard disk is adapted to be engaged with the first hard disk rack engagement members through the first body engagement members, so as to prevent the body from moving relatively to the hard disk rack in a direction opposite to the first direction and from moving in the second direction, wherein the first direction is perpendicular to the second direction.

5. The disk tray according to claim 4, wherein each of the cover lateral walls comprises a first cover engagement member, the hard disk rack comprises a plurality of second hard disk rack engagement members corresponding to the first cover engagement members, and when the body of the hard disk is disposed on the hard disk rack, and the cover is closed to the body, the first cover engagement members are engaged with the second hard disk rack engagement members, so as to prevent the cover from moving relatively to the hard disk rack in a direction opposite to the second direction.

6. The disk tray according to claim 1, wherein the body comprises a second body engagement member, the cover comprises a second cover engagement member corresponding to the second body engagement member, and the cover is fixed to the body through the second cover engagement member in co-ordination with the second body engagement member.

7. A disk rack assembly, adapted to be disposed together with a hard disk in a server, the disk rack assembly comprising:
a hard disk rack, comprising a hard disk rack bottom and a plurality of first hard disk rack engagement members and a plurality of second hard disk rack engagement members which are disposed on the hard disk rack bottom; and
a disk tray, detachably fixed to the hard disk rack, adapted to carry the hard disk, and comprising:
a body, comprising two body lateral walls, wherein each of the body lateral walls comprises a first body engagement member extending in a first direction and bent in a second direction; and
a cover, pivoted to the body and comprising two cover lateral walls, wherein each of the cover lateral walls comprises a first cover engagement member, and a hardness of the cover is greater than a hardness of the body, wherein
the body is prevented from moving relatively to the hard disk rack in a direction opposite to the first direction and from moving in the second direction by the first body engagement members engaged with the first hard disk rack engagement members, and the first cover engagement members are engaged with the second hard disk rack engagement members when the cover is closed to the body, so as to prevent the cover from moving relatively to the hard disk rack in a direction opposite to the second direction.

8. The disk rack assembly according to claim 7, wherein the hard disk rack comprises a plurality of fixing structures respectively fixed to the hard disk rack bottom and located at two sides of the disk tray to form a guiding rail, and the first hard disk rack engagement members and the second hard disk rack engagement members are respectively formed on the fixing structures.

9. The disk rack assembly according to claim 7, wherein the hard disk comprise a plurality of screw holes at two sides, the body comprises a plurality of fixing members protruding from the two body lateral walls and corresponding to at least a part of the screw holes, when the hard disk is placed in the hard disk tray, the fixing members extend into the at least a part of the screw holes, and when the cover is closed to the body, the two cover lateral walls are located outside the two body lateral walls, so as to prevent the two body lateral walls from moving outwardly.

* * * * *